United States Patent [19]

Cripps et al.

[11] Patent Number: 4,897,527

[45] Date of Patent: Jan. 30, 1990

[54] PRESS FOR FABRICS

[75] Inventors: Alan H. Cripps, Hitchin; Peter Williams, Biggleswade, both of United Kingdom

[73] Assignee: John Corby Limited, Hampshire, England

[21] Appl. No.: 324,991

[22] Filed: Mar. 17, 1989

Related U.S. Application Data

[63] Continuation of Ser. No. 6,548, Mar. 9, 1987, abandoned.

[30] Foreign Application Priority Data

May 9, 1985 [GB] United Kingdom ............... 8511730

[51] Int. Cl.⁴ .................................... H05B 1/02
[52] U.S. Cl. ......................... 219/492; 219/497; 219/501; 219/505; 219/252; 323/236; 38/17; 38/82
[58] Field of Search ............... 219/250, 251, 252, 490, 219/492, 493, 494, 497, 499, 501, 505, 506, 508, 509; 323/235, 236, 319; 38/17, 144, 82, 71, 1 B

[56] References Cited

U.S. PATENT DOCUMENTS 3,290,807 12/1966 Esaka ............................. 38/71
4,277,671 7/1981 Mori et al. ..................... 323/236
4,330,702 5/1982 Cheng ............................ 219/492
4,375,205 3/1983 Green ............................ 219/492
4,547,657 10/1985 Sticher, Jr. et al. ............ 219/492
4,580,038 4/1986 O'Loughlin .................... 219/252

FOREIGN PATENT DOCUMENTS 2472049 6/1981 France .
1546131 5/1979 United Kingdom .
2016051 9/1979 United Kingdom .
2073455 10/1981 United Kingdom .

Primary Examiner—M. H. Paschall
Attorney, Agent, or Firm—Cushman, Darby & Cushman

[57] ABSTRACT

A fabric press comprises a press with a heating element (1) a temperature sensor (17), and a microprocessor based controller programmed to apply electrical power initially to the element for a boost period during which the press temperature is limited to a boost temperature, and then at the end of the boost period, to reduce the applied power and thereafter to control the power to maintain the press temperature substantially at a lower normal temperature. The controller comprises microprocessor (14) which supplied signals to a triac (12), the signals being timed to be applied at the zeros of the a.c. supply voltage and to switch the heater power for complete cycles of the supply voltage.

8 Claims, 4 Drawing Sheets

PRESS FOR FABRICS

This is a continuation of application Ser. No. 07/006,548, filed Jan. 9, 1987 now abandoned.

THE FIELD OF THE ART

This invention relates to an improved press for fabrics, for example, a trouser press.

BACKGROUND OF THE PRIOR ART

When pressing fabrics it is known that the higher the temperature and the greater the period for which heating is applied, the better the result produced. However, maintaining high temperature for a prolonged period is extravagant in energy consumption, and also involves a risk of hot spots due to uneven heating, which may cause localised marking of the fabric. Excellent results may also be obtained by the injection of superheated steam into fabric stressed under pressure, but the necessary equipment is cumbersome and expensive, and places the operator in some risk.

The present invention overcomes these difficulties and provides a press, for example, a trouser press, which is efficient, reasonably economical in energy requirement, and has less risk of damaging the fabric or burning the operator than the above methods.

SUMMARY OF THE INVENTION

According to the present invention a fabric press comprises a press with a heating element, a temperature sensor and timing means, wherein the press includes a controller arranged to apply electrical power initially to the element for a boost period during which the press temperature is limited to boost temperature, and then, at the end of the boost period, to reduce the applied power and thereafter to control the power to maintain the press temperature substantially at a lower normal temperature until a pre-set time has elapsed.

Preferably the boost temperature is in the range of 65° C. to 90° C. and is reached at some time during a boost period of 10 minutes or less after switching on. At the end of the boost period power is preferably switched off, and the temperature allowed to fall to a normal temperature of in the region of 55° C. to 65° C., at which it is maintained the pre-set time, preferably 15 to 45 minutes after switching on.

During the boost period, under the influence of the elevated temperature and the pressure due to the press, the crease is formed into the fabric. At the lower temperature the crease is set. The reduction in temperature effects a considerable saving in power consumed, and also reduces the risk of damage to the fabric and of accidental burns to the user.

A controller suitable, inter alia, for the control of a fabric press as described above operates from an alternating current supply and is arranged to supply heating current to a heating element through a triac. The controller includes a microprocessor which operates during each cycle of the supply voltage to determine whether further power needs to be supplied to the heating element. When power is so required the microprocessor triggers the triac at the voltage zero marking the start of the next succeeding voltage cycle and causes it to supply power to the heating element for that complete cycle. By supplying power for complete cycles in this way unsymmetrical loading of the power supply is avoided.

BRIEF DESCRIPTION OF THE DRAWING

The invention will be further described by way of example with reference to the accompanying drawings in which.

DETAILED DESCRIPTION OF THE PREFERRED EMBODIMENT

Figure 1:
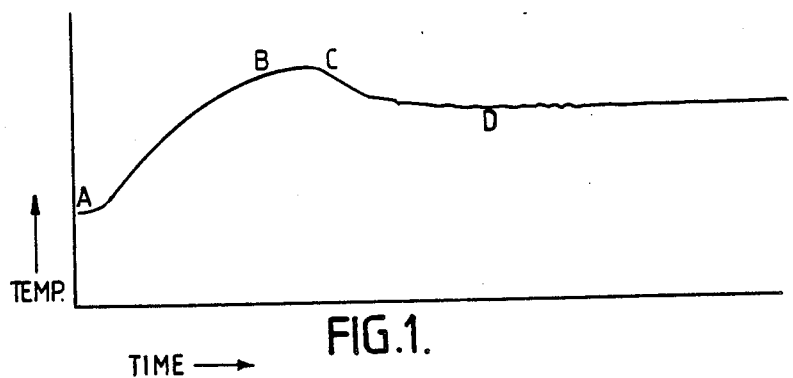
FIG. 1 is a curve of temperature as a function of time for a typical trouser press.

Referring first to FIG. 1, A represents the point at which the press is switched on, and it is assumed initially to be a room temperature. The supply of power to the heating element raises the temperature to a region marked B in the neighbourhood of 80° C., at which the creases are formed in the material, after some 8 minutes have elapsed from first switching on. At the point C in FIG. 1 the power is shut off, and the temperature begins to fall until it reaches the pre-set normal temperature of 60/65° C., at which it is maintained by the controller for a further period until a time pre-set by the user, generally in the range of 15–45 minutes, has elapsed, after which the power is shut off.

Figure 2:
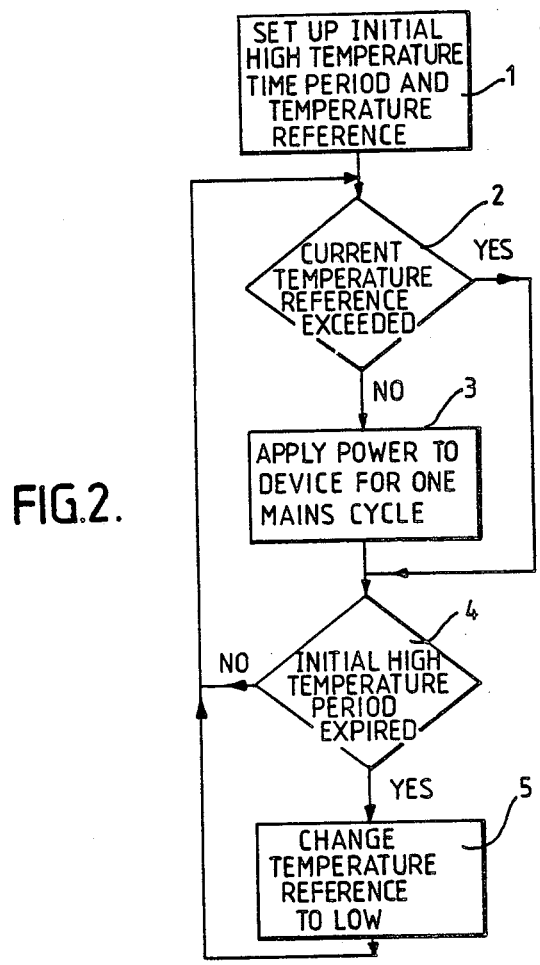
FIG. 2 is a flow diagram of the trouser press control.

FIG. 2 is a flow sheet illustrating the operation of the controller. Initially, as represented by box 1 on the diagram, the times and temperatures required are set into the controller. At 2 the temperature is checked to determine whether it has exceeded the applicable reference value; if not power is supplied to the heating element for one supply cycle as indicated at 3. If the reference temperature has been exceeded this step is by-passed.

Next, at 4, it is checked whether or not the initial overshoot heating period has expired. If not, control returns to 2 and heat is again supplied for one cycle if necessary in order to maintain the temperature at the reference temperature. If the period has expired control proceeds to box 5, changing the temperature reference to the normal temperature for the holding period, and the cycle repeats with this lower reference temperature.

Figure 3:
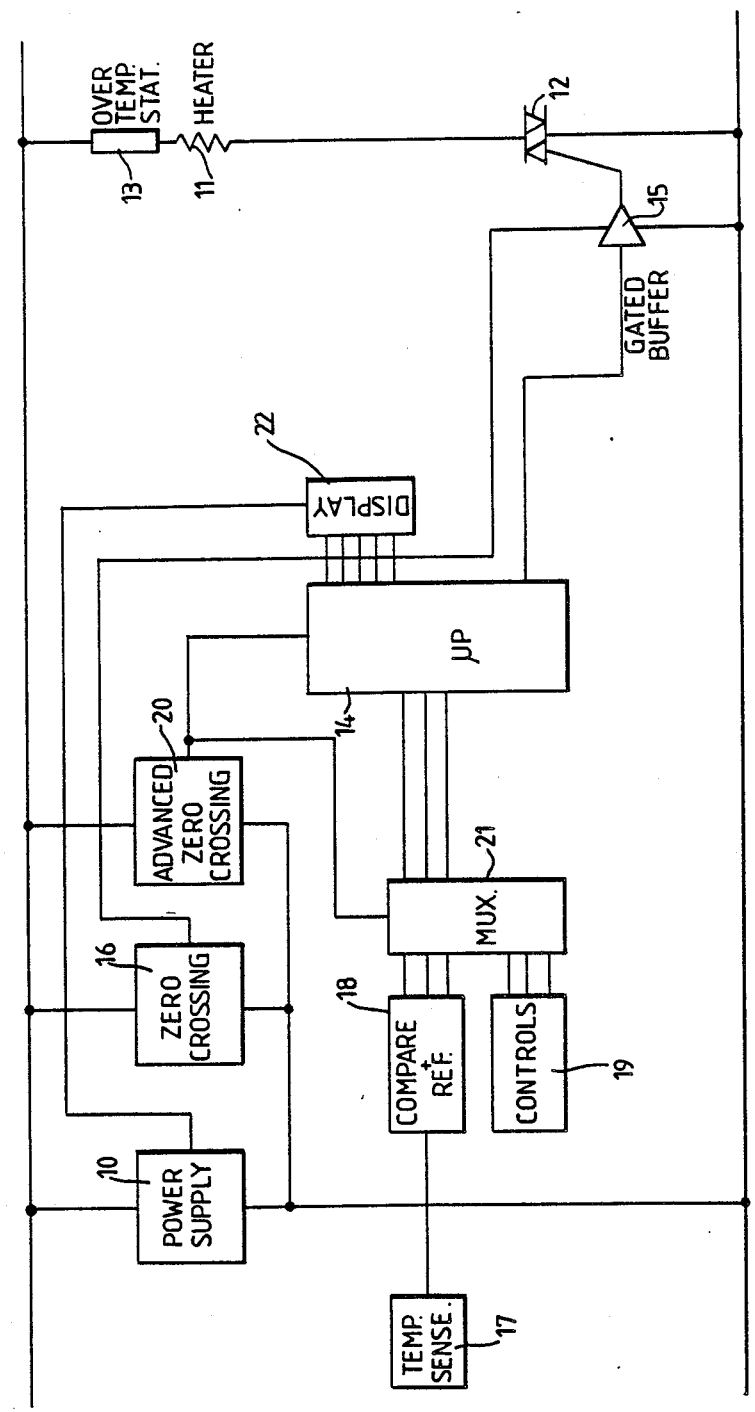
FIG. 3 is a block diagram of the controller employed with the press.

FIG. 3 shows in simplified block diagram form, the power supply, heater and controller of the invention.

The system draws its power from a power supply 10 which, in general, will be the normal domestic mains supply at 220/240 volts and 50/60 Hz frequency. The controller controls supply of this power to a heating element 11 by means of a triac 12. A thermostatic cut out 13 protects the equipment against overheating due to accidental failure of any component.

The system operates under the control of a microprocessor 14 controlling the triac 12 through a gated buffer 15. A zero-crossing detector 16 detects the voltage zeros of the supply and supplies a gating signal to the buffer 15, ensuring that the triac 12 is always triggered at a voltage zero, thereby avoiding radio interference.

The temperature in the press is sensed by a temperature sensor 17 and compared with the appropriate reference temperature by a comparator 18. Operator switches in pre-set controls 19 allow the required temperatures and times to be pre-set into the system.

A furthr zero-crossing detector 20 provides a signal slightly in advance of each voltage zero of the power supply to the microprocessor 14 and to a multiplexer 21.

The multiplexer 21 switches in each cycle, so that during the positive half cycle it supplies signals from the control switches 19 to the microprocessor 14 and during the negative half cycle it supplies signals from the temperature comparator 18 to the microprocessor. The microprocessor operates on these signals to determine whether or not the power should be supplied to the heater in the next succeeding cycle of the supply, and if so it provides a switching signal to the buffer 15. Since the multiplexer 21 and the microprocessor 14 are timed by the advanced zero crossing detector 20, which provides its signal just in advance of each zero-crossing point, the trigger signal is available at the buffer 15 just before the supply voltage falls to zero. At the instant of zero, the zero-crossing detector 16 supplies a gating signal to the buffer 15, triggering the triac at the moment when the voltage has fallen to zero, and so avoiding a voltage pulse which could cause radio interference.

Operation continues in this way, the triac 12 being triggered or not, as the case may be, on each cycle, under the control of the microprocessor 14, to maintain the required time/temperature relationship. A display 22, making use of light-emitting diodes, may be used to indicate the stage in the process currently reached.

The microprocessor itself and the timing, display driving, triac firing, interrogation of the controls, and the temperature comparators may all be performed by a signal chip, for example, a COP 9411.

Figure 4A:
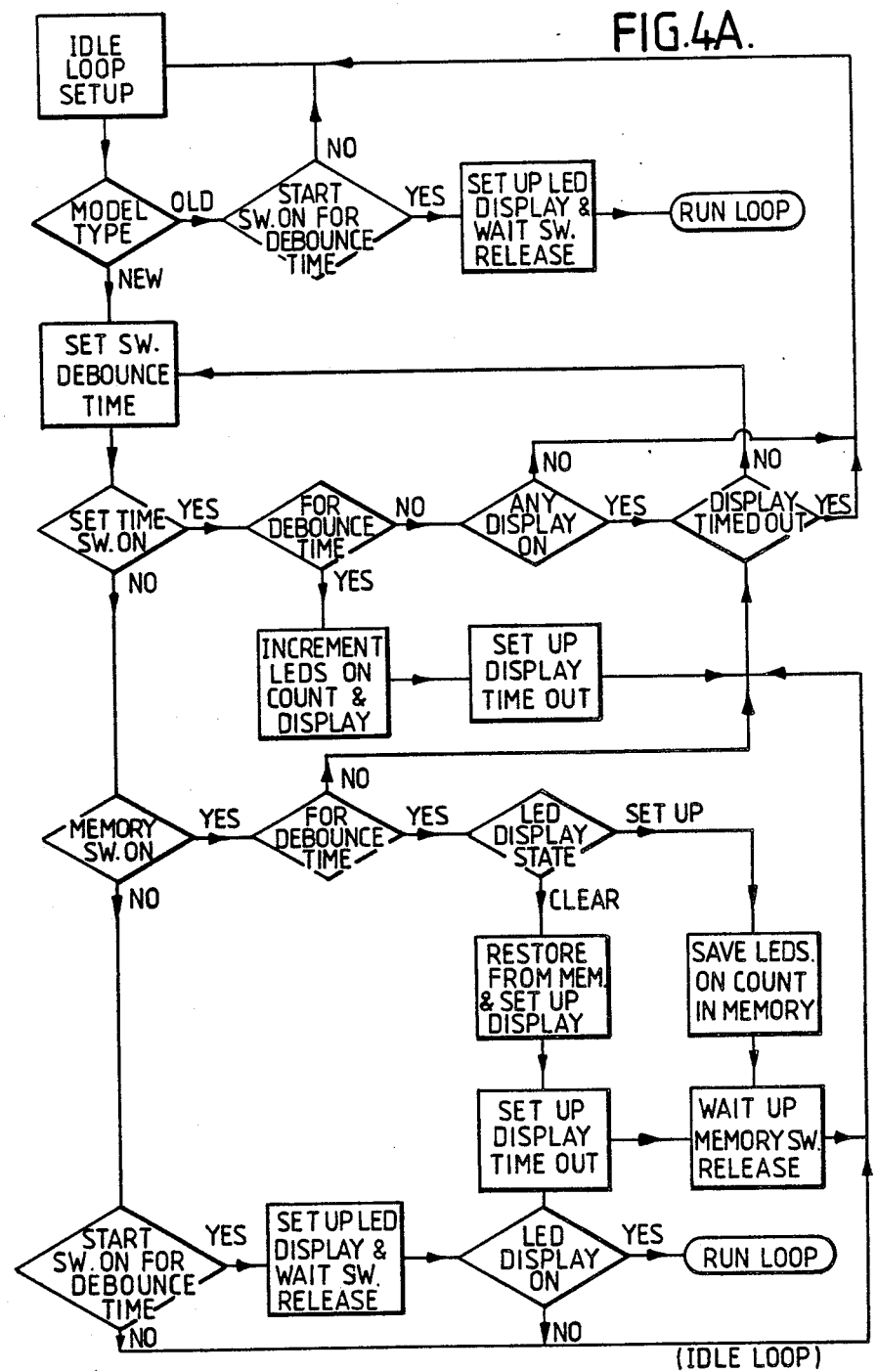
Figure 4B:
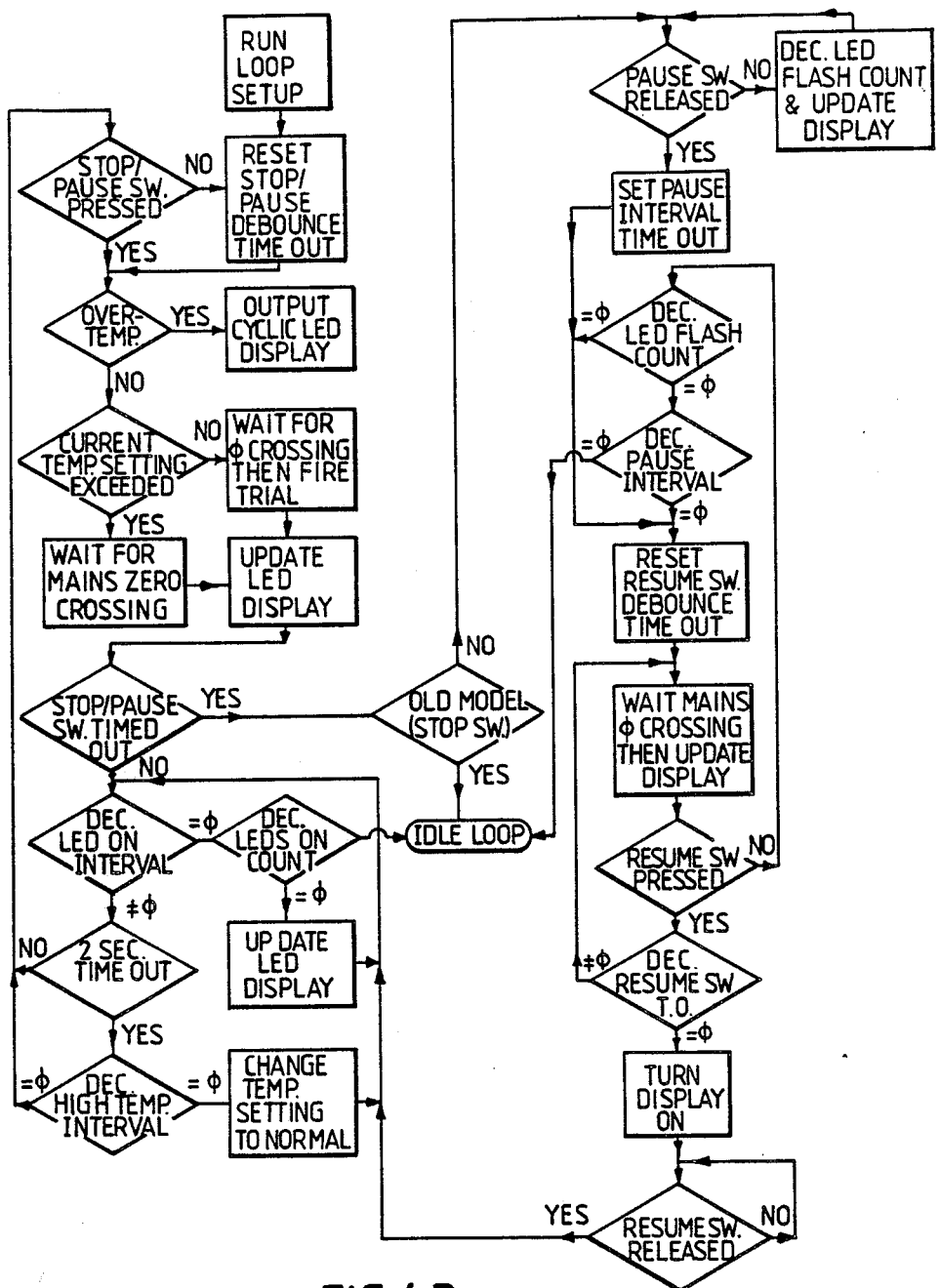

Two further figures, FIGS. 4A and 4B illustrate a preferred control program in flow chart form.

THE CONTROL PROGRAM

The control program monitors external conditions through its input parts, acts accordingly, and displays its current state via its output ports.

The program comprises three main loops:
the idle loop which monitors the switches
the run loop which monitors the temperature levels, fires the triac and inspects the stop/pause switch
the pause loop which monitors the resume (1 pause) switch with the LED display indicating the state of the program thus.

*Timing is taken from the mains zero crossing, being a change in logic level (corresponding to mains polarity) into a serial input (SI) port (not shown). The logic level also indicates which, out of the switches and temperature levels, is multiplexed into the port. Fixed external conditions, as to mains frequency (50/60 Hz), model type (old/new), and run mode (test/normal), are obtained from bits 4, 5 and 6 of an output port (not shown).

Bit 7 of this port controls the triac. All timing loops include a call of a zero-crossing detection subroutine, as do all those that examine the switches and/or temperature levels, as these have to be read in from the G port (not shown), at the same time, and saved in the appropriate store. The timings carried out are:
(1) Switch debounce of 0.1 second;
(2) Set time acceptance, 4 seconds;
(3) Heating period, as selected;
(4) High temperature period, 8 minutes; and
(5) Pause period, 30 seconds.

Times are counted down, decrementing by 1 (for each half mains cycle) the least significant part, and propagating the borrow. The carry flag is set on entry to the counting subroutine, and cleared if borrow is propagated from the least significant part. Also bits in the least significant part are used to determine the on-/off state of the LED display when it is being flashed.

(1) If the frequency compensation count has expired (carry bit clear) then the high temperature is decremented by 1, returning to the run loop if this has not expired, otherwise the reference temperature level is set to normal (i.e. $\phi$) and control returned to the run loop.

(2) If the stop/pause switch is not pressed then the switch debounce period is reset.

(3) The current temperature level is checked and if found to be over temperature then the program goes into an endless loop, with the triac turned off. If the temperature level is found to be below the required setting then the triac is fired.

(4) Finally the switch debounce is decremented by 1 and if it has not expired then the loop is repeated, otherwise control is returned either to the idle loop on to the pause loop.

(5) In the pause loop After setting up the pause period time, the program waits for the switch to be released, since it becomes the means for resuming the run function. If the pause period expires before the switch debounce then control returns to the idle loop.

While the invention has been described in connection with what is presently considered to be the most practical and preferred embodiments, it is to be understood that the invention is not limited to the disclosed embodiment but, on the contrary is intended to cover various modifications and equivalent arrangements included within the spirit and scope of the appended claims.

We claim:
1. A fabric press comprising:
    a press operable to perform a fabric pressing cycle with a heating element;
    a temperature sensor; means for timing; and
    a controller arranged to apply electrical power initially to the heating element for a predetermined boost period of said fabric pressing cycle during which the press temperature is limited to a boost temperature, and then, at the end of the predetermined boost period, to reduce the applied power and thereafter control the power in a further period of said fabric pressing cycle to maintain the press temperature at a substantially lower normal temperature until a pre-set time has elapsed.

2. A fabric press according to claim 1 wherein the boost temperature is in the range of 65° C. to 90° C. and the normal temperature is at least 10 degrees C. less than the boost temperature and is in the range of 55° C. to 65° C.

3. A fabric press according to claim 2, wherein the boost temperature is approximately 80° C.

4. A fabric press according to claim 2, wherein the predetermined boost period is of a duration equal to or less than 10 minutes and the pre-set time is in the range of 15 minutes to 45 minutes after switch-on.

5. A fabric press according to claim 1 having an alternating current input, and a triac, and wherein the controller includes a microprocessor for supplying trigger signals to the triac, the trigger signals being timed to be applied at the zeros of the supply voltage and to switch the heating element power for complete cycles of the supply voltage, the microprocessor being arranged to trigger the triac whenever the temperature sensed by the temperature sensor falls below a reference value determined by a pre-set time/temperature relationship.

6. A fabric press according to claim 5, wherein the controller includes:

a comparator for comparing the sensor temperature with the pre-set temperature to produce comparison signals, a multiplexer arranged to supply to the microprocessor said comparison signals from said comparator during half of each supply cycle, and during the other half of each supply cycle providing signals representing the settings of pre-set time and temperature controls.

7. A method of operating a fabric press having a heating element, a temperature sensor and timing means, comprising the steps of:

applying the electrical power to a heating element during an initial predetermined boost period of a fabric pressing cycle during which the press temperature is prevented from exceeding a predetermined boost temperature, reducing the applied power in a further period of said fabric pressing cycle, and controlling the power to maintain the press temperature at a substantially lower normal temperature than the predetermined boost temperature for a pre-set time in said further period of said fabric pressing cycle.

8. A method according to claim 7, wherein the boost temperature is in the range of 65° C. to 90° C. and the normal temperature is at least 10 degrees C. less than the boost temperature and is in the range of 55° C. to 65° C.

* * * * *